(12) United States Patent
Marks et al.

(10) Patent No.: US 10,288,093 B2
(45) Date of Patent: May 14, 2019

(54) DEVICE FOR REDUCING VIBRATIONS IN A HYDRAULIC ACTUATING SYSTEM, PARTICULARLY HYDRAULIC CLUTCH ACTUATING SYSTEM FOR MOTOR VEHICLES

(71) Applicant: FTE automotive GmbH, Ebern (DE)

(72) Inventors: Paul Marks, Ebern (DE); Wilfried Weibelzahl, Grub a. Forst (DE)

(73) Assignee: FTE automotive GmbH, Ebern (DE)

( * ) Notice: Subject to any disclaimer, the term of this patent is extended or adjusted under 35 U.S.C. 154(b) by 0 days.

(21) Appl. No.: 15/453,251

(22) Filed: Mar. 8, 2017

(65) Prior Publication Data

US 2017/0248173 A1  Aug. 31, 2017

Related U.S. Application Data (63) Continuation-in-part of application No. 13/145,408, filed as application No. PCT/EP2010/000376 on Jan. 22, 2010, now Pat. No. 9,605,718.

(30) Foreign Application Priority Data

Jan. 22, 2009 (DE) .................. 10 2009 005 830
Mar. 31, 2016 (DE) .................. 10 2016 003 717

(51) Int. Cl.
*F15B 21/00* (2006.01)
*F16D 25/08* (2006.01)
(Continued)

(52) U.S. Cl.
CPC .......... *F15B 21/008* (2013.01); *F16D 25/088* (2013.01); *F16D 65/0006* (2013.01); *F16D 2048/0215* (2013.01)

(58) Field of Classification Search
CPC ............................................. F16D 2048/0215
See application file for complete search history.

(56) References Cited

U.S. PATENT DOCUMENTS 3,592,360 A    7/1971  Aleck
5,320,203 A *  6/1994  Wilber ............. F16D 25/088
                                              192/109 F
(Continued)

FOREIGN PATENT DOCUMENTS

DE         3631507      3/1988
DE         4003521      8/1991
DE      102007003723    7/2008

OTHER PUBLICATIONS

German Office Action; Applicant: FTE automotive GmbH; Appln. No. 10 2016 003 717.2; dated Feb. 9, 2017.
(Continued)

*Primary Examiner* — Mark A Manley
(74) *Attorney, Agent, or Firm* — Reising Ethington PC (57) ABSTRACT

A device for vibration reduction in a hydraulic actuating system has a housing in which a pressure chamber is able to be disposed in fluid connection with the actuating system by way of at least one connection and bounded by a resilient membrane. The membrane has a pressure-loadable surface and a surface which is remote therefrom and provided with a profiling, by way of which the membrane when loaded with pressure can be supported on a fixed wall section of the housing and which has at least one web section comprising at least one web with a web foot, a web end adjacent to the wall section, and a defined web cross-section. The web is of asymmetrical construction with respect to a notional plane extending normal to the pressure-loadable surface through the web foot and perpendicularly to the web cross-section.

19 Claims, 6 Drawing Sheets

(51) Int. Cl.
*F16D 48/02* (2006.01)
*F16D 65/00* (2006.01)

(56) References Cited

U.S. PATENT DOCUMENTS

| | | | |
|---|---|---|---|
| 5,816,046 | A | 10/1998 | Paeth et al. |
| 6,039,078 | A * | 3/2000 | Tamari ................ A61M 1/0031 |
| | | | 138/30 |
| 6,647,722 | B2 | 11/2003 | Schorr et al. |
| 7,107,768 | B2 | 9/2006 | Welter et al. |
| 7,328,722 | B2 * | 2/2008 | Rich ....................... F04B 43/12 |
| | | | 138/26 |
| 7,857,005 | B2 | 12/2010 | Rich et al. |
| 9,605,718 | B2 | 3/2017 | Gerbert et al. |
| 2006/0243552 | A1 * | 11/2006 | Gebert ...................... F15B 7/00 |
| | | | 192/30 V |
| 2007/0209899 | A1 * | 9/2007 | Liu .......................... F16D 3/66 |
| | | | 192/55.2 |

OTHER PUBLICATIONS

European Search Report; No. EP17000527.6 dated Sep. 11, 2017; 8 pages.

\* cited by examiner

DEVICE FOR REDUCING VIBRATIONS IN A HYDRAULIC ACTUATING SYSTEM, PARTICULARLY HYDRAULIC CLUTCH ACTUATING SYSTEM FOR MOTOR VEHICLES

TECHNICAL FIELD

The present invention relates to a device for reducing vibrations in a hydraulic actuating system. In particular, the invention relates to a device for reducing vibrations or pressure pulsations in a hydraulic clutch actuating system for motor vehicles, such as used on a large scale in the automobile industry.

BACKGROUND OF THE INVENTION

A conventional hydraulic clutch actuating system for motor vehicles has a master cylinder mounted on a pedal bracket of the motor vehicle and a slave cylinder which is fixed in the vehicle near the transmission and which is constructed conventionally or as a central release device in coaxial arrangement with respect to a transmission shaft. The master cylinder and slave cylinder are hydraulically connected together by way of a hydraulic line. The piston of the hydraulic master cylinder, which is hydraulically connected with a compensating reservoir, is operatively connected with a clutch pedal by way of a piston rod so that the master cylinder can be actuated by pressing down the clutch pedal, which causes displacement of the piston in the master cylinder. In that case, a fluid column is pushed through the hydraulic line in the direction of the slave cylinder and hydraulically loads the slave cylinder. The slave cylinder, more precisely the piston thereof, is disposed in operative connection with a release mechanism of a friction clutch by way of a piston rod via a release lever and release bearing or, in the case of the central release device with an annular piston and a sliding sleeve, directly via the release bearing seated on the sliding sleeve.

If the slave cylinder is hydraulically loaded for disengaging the friction clutch then by the piston-actuated release mechanism a clutch pressure plate is separated from a clutch driven plate of the friction clutch, the driven plate being seated on a transmission shaft and co-operating with a flywheel carried by the crankshaft of the combustion engine. As a result, separation of the combustion engine from the transmission of the motor vehicle takes place. If, on the other hand, the clutch pedal is relieved of load so as to re-engage the friction clutch, the slave cylinder, more precisely the piston thereof, is returned to its basic or start setting as a consequence of, inter alia, the spring forces of the friction clutch, in which case the above-mentioned fluid column is displaced through the hydraulic line back again in the direction of the master cylinder.

In such a hydraulic clutch actuating system—to be regarded as a quasi-static hydraulic force transmission system in which there is no continuous flow of the hydraulic fluid—vibrations are transmitted from the combustion engine, particularly the crankshaft thereof, via the components of the friction clutch, the release bearing, in certain circumstances the release lever, and the slave cylinder to the fluid column present in the hydraulic line between the slave cylinder and master cylinder, in which the vibrations propagate as pressure pulsations.

It is already regarded as disadvantageous that these pressure pulsations can be sensed by the driver as vibrations at the clutch pedal—commonly referred to as "tingling"—particularly when in typical city driving a foot rests on the clutch pedal or the depressed clutch pedal is held, for example, during a stop at traffic lights.

There is no lack of proposals in the prior art on how to deal with this problem (for example, DE 36 31 507 C2, DE 40 03 521 C2, U.S. Pat. No. 5,816,046, 6,647,722 or 7,107,768). It is common to these proposals that a separate subassembly, which does not interrupt the fluid column between master cylinder and slave cylinder and which in general is also capable of satisfactorily damping the pressure pulsations, for vibration damping is inserted or arranged in or parallel to the hydraulic line between master cylinder and slave cylinder. However, the prior art solutions in part demand a relatively large amount of installation space, which is not always available to sufficient extent in the engine compartment of the motor vehicle, and/or require a relatively complex and accordingly expensive construction of the device, which is not desirable for mass production.

Against this background there was proposed in document U.S. 2011/303315 (FIGS. 17 and 18), U.S. Ser. No. 13/145,408 filed on Aug. 8, 2011 which forms the preamble portion of claim 1, in particular a device for reducing pressure pulsations, the device having a housing in which is formed a pressure chamber able to be disposed in fluid connection with a hydraulic actuating system by way of two connections. In this reference—as one of the proposed damping measures—the pressure chamber is bounded by a resilient membrane having a pressure-loadable surface facing the pressure chamber and a surface remote from the pressure chamber. The surface remote from the pressure chamber is in that case provided with a profiling by way of which the membrane when loaded with pressure can be supported at a fixed wall section of the housing and which has a plurality of web sections each with a plurality of webs. Each web has a web foot distant from the wall section of the housing, a web end near the wall section and a defined web cross-section. This profiling shall, under pressure-loading of the membrane and by pressing against the fixed wall section of the housing, produce—in dependence on the static prevailing pressure and the amplitude of the pressure pulsation—a defined, limited volume take-up in the pressure chamber, which in turn influences the damping characteristics of the device.

In general, it can be said with respect thereto that the higher the possible volume absorption by the volume absorbing component—here the resilient membrane with the profiling thereof, i.e. its membrane contour—the more effectively a pressure pulsation in the fluid column is damped. However, on the other hand the overall volume absorption of the hydraulic actuating system has to be kept as small as possible so as to not make the actuating system too "soft" and to avoid, due to pedal travel losses accompanying excessive system softness, a "spongy" actuating feel.

To that extent, in the case of the prior art devices for reducing pressure pulsations with the assistance of a profiled resilient membrane it is common to find a membrane contour leading to a degressive volume/pressure characteristic curve, i.e. in relation to low pressures (for example up to 5 bars) there is a relatively large volume absorption when the profiling is pressed against the fixed housing wall, whereas at higher pressures (for example 20 to 30 bars) and stronger pressing of the profile against the housing wall a significantly smaller volume can be taken up.

Against this background, it is clear that the prior art solution is capable of effectively reducing the afore-described "tingling" at lower pressures in the fluid column as a consequence of a relatively large volume absorption capability by the profiled membrane, but at increasing pressures in the fluid column progressively loses its damping effect by the profiled member due to a significantly diminishing volume absorption capability. However, it is also necessary to effectively reduce the transmission of pressure pulsations when the clutch pedal is depressed, i.e. at comparatively high pressures in the fluid column, for which reason further damping measures were provided in the prior art (additional line section with a helically extending helix section, cross-sectional narrowing with throttling effect, etc.), but these cause a degree of additional cost.

If it is additionally taken into account that there are vehicle-individual pressure regions, i.e. differing in dependence on the respective hydraulic actuating system and the vibration behavior thereof, with highest amplitudes of the pressure pulsation in the fluid column, a device for reducing pressure pulsations would be desirable which has a volume/pressure characteristic curve able to be steeper in vibration-critical pressure regions (higher volume absorption capability) than in the remaining pressure regions, where a flatter characteristic curve path (smaller volume absorption capability) would promise "stiffer" system behavior.

What is desired is a device for reducing vibrations in a hydraulic actuating system, particularly hydraulic clutch actuating system for motor vehicles, which has the simplest, most economic and most compact construction possible and is optimized with respect to its vibration damping characteristics produced by a profiled resilient membrane.

SUMMARY OF THE INVENTION

According to one aspect of the invention, a device for reducing vibrations in a hydraulic actuating system, particularly a hydraulic clutch actuating system for motor vehicles has a housing in which is formed a pressure chamber. The pressure chamber is fluid-connectable with the hydraulic actuating system by way of at least one connection and being bounded by a resilient membrane having a pressure-loadable surface facing the pressure chamber and a surface remote from the pressure chamber. The latter surface is provided with a profiling by way of which the membrane when loaded with pressure is capable of support against a fixed wall section of the housing and which has at least one web section. At least one web has a web foot distant from the wall section, a web end near the wall section and a defined web cross-section. The or each web is formed asymmetrically with respect to a notional plane extending normal to the pressure-loadable surface of the membrane through the web foot and perpendicularly to the web cross-section so that the or each web when the membrane is subjected to a predetermined pressure loading buckles without hindrance in a predetermined direction under support of the web end at the wall section.

By the term "buckle"—which in engineering mechanics is strictly understood as loss of stability until abrupt and violent failure of straight or slightly curved rods or bars under the action of buckling loads having a line of action lying in the rod axis and/or of bending moments—it is meant in this connection that the web, which is clamped in place between its web foot at the membrane side and its web end bearing against the wall section remote from the membrane, abruptly or suddenly deviates or resiliently deflects towards a predetermined side as a consequence of its asymmetrical cross-section in the case of a defined level of pressure loading of the membrane. The term "buckle" is thus not to be restrictively understood, with respect to the geometry of the webs and the mechanism of the process, in the sense of "rod-shaped or bar-shaped" or "buckling of the Euler column in elastostatics" or the like. Depending on the respective geometry of the webs it can also be regarded in mechanical terms as "bulging"—by which in engineering mechanics there is understood, in particular, deflection of plates, the loading of which substantially represents a disc stress state, from a plane or the deflection of shells, the loading of which substantially represents a membrane stress state. If, for example, the resilient membrane is tubular, thus rotationally symmetrical, and is provided at the outer circumference with encircling grooves for formation of the web or webs then the respective web deforms under the influence of the pressure load at the actual component more like a plate than a strut. It is significant that the respective web, which under pressure loading of the membrane is pressed at the end against the fixed wall section of the housing, on reaching of a predetermined pressure suddenly and reversibly breaks away to the side so that the resilient membrane abruptly makes possible a larger volume take-up, as a result of which in turn a pressure pulsation running through the pressure chamber is more effectively damped.

In other words, a basic concept of the invention is to be seen in selectively implementing the characteristic of buckling or bulging in the structure, more precisely its profiling—which has at least one web section with at least one web—of the resilient membrane. It is thereby achieved that the volume take-up by the profiled resilient membrane as recorded against pressure initially runs substantially linearly before the web structure of the profiling freely buckles at a predetermined pressure, so that the volume/pressure characteristic curve abruptly extends substantially more steeply from this pressure. A flatter, degressive course of the volume/pressure characteristic curve reappears only when all structural elements of the web structure have buckled. Thus, in the flat regions of the volume/pressure characteristic curve of the device at specific pressures there is a "stiffer" system behavior, which in use of the device in hydraulic clutch actuating system for motor vehicles means only small pedal travel losses and a good, direct actuation feel, whereas in the steep "buckle" region or regions of the volume/pressure characteristic curve a "softer" system behavior satisfactorily damping pressure pulsations is present.

In that case, the asymmetrical construction of a respective web with respect to the notional plane extending normal to the pressure-loadable surface of the membrane through the web foot and perpendicularly to the web cross-section acquires a special significance. In particular, this has the effect that a respective pressure-loaded web clamped in place is capable of supporting the pressure load less towards one side than towards the opposite side, so that a respective web on reaching the critical pressure load always buckles in the same preferential direction, which has the consequence of a uniform volume absorption and this always at one and the same critical pressure load. By contrast to a symmetrical construction of a web which is capable of buckling and in which "breaking away" of the web in one or other direction would occur more or less randomly under a non-specific critical pressure load, the claimed asymmetrical form of the respective web always leads to readily reproducible results, not only with regard to the level of the pressure at which buckling takes place, but also with respect to the then-resulting volume absorption by the membrane.

It is apparent that with the membrane construction in accordance with the invention a high volume take-up particularly effective for damping is achievable not only at low pressures, as in the prior art outlined above, but quasi punctiformly in any vibration-critical pressure ranges and, in particular, through appropriate design of the web section or sections without this requiring more installation space or complicated and accordingly cost-intensive further measures having to be provided for that purpose or having to pay for improved damping effect by overall softer system behavior. The device concept according to the invention is thus apposite to hydraulic clutch actuating systems for motor vehicles, where through suitable design of the web section or sections a vehicle-individual adaptation can be undertaken, so that a higher volume absorption capability through the resilient membrane is given only in pressure ranges vibration-critical to the respective motor vehicle, which membrane is then capable of effectively reducing the pressure pulsations.

Apart from the material characteristics of the resilient membrane, the geometry of the respective web obviously has a decisive influence on the buckling behavior thereof. If the web is too slender as viewed in cross-section the web will buckle out even at very low pressure loads, which having regard to the above explanations is not desired. If, by contrast, the web is too wide as considered in cross-section there is the possibility that the web is only urged towards the fixed wall section of the housing without buckling taking place. As investigations by the inventor have shown, against this background—in an advantageous design of the membrane profiling—the ratio of the mean width of the respective web to the height of the respective web in the unloaded state of the membrane should be equal to or greater than $\frac{1}{3}$ and equal to or smaller than 1. The "height" of the respective web in that regard means the spacing between the web foot and the web end of the respective web as measured normal to the pressure-loadable surface of the membrane, whereas the "mean width" of the respective web denotes the arithmetic mean between a maximum web width and a minimum web width respectively measured in a direction perpendicular to the above surface normal.

In principle, various asymmetrical web cross-sections, for example parallelogram-shaped, triangular or sawtooth-shaped, are conceivable for the asymmetrical construction of the respective web to promote buckling of the web and buckling in one direction. However, of particular preference for reasons of production engineering is a design in which the web cross-section has substantially the form of a trapezium, particularly a right-angled trapezium, in which the web foot forms the base of the trapezium.

In a further preferred embodiment, the respective web can be formed to be uninterrupted in a predominant direction of the web, which has particular production engineering advantages. However, in order to displace the response behavior of the resilient membrane in the direction of lower pressures the web can also be constructed to be interrupted in its predominant direction. The web is then somewhat less stable, i.e. buckling takes place at a lower pressure. If such an interruption is executed with appropriate frequency, short buckling columns which then buckle at even lower pressure might arise. The buckling behavior of a web can thus be influenced by way of the number of interruptions: in principle, the more interruptions a web has, the less stable it is, so that lower pressure loads suffice to shift it.

In further pursuit of the concept of the invention the respective web can be formed by two grooves of the web section, which grooves are spaced apart by the width of the web and emanate from the surface of the membrane remote from the pressure chamber, wherein the web extends by its web end in the undeformed state of the membrane at most up to the height of the surface remote from the pressure chamber. By comparison with an equally conceivable profiling elevated relative to the remainder of the resilient membrane such a web structure set back or flush or accommodated in the membrane surface is particularly suitable for those damping applications in which at the start of actuation of the hydraulic actuating system, i.e. at lower pressures, only a small volume take-up is to be provided by the resilient membrane, but later, i.e. at larger, vibration-critical pressures, a greater volume take-up is desired, namely the jump in the volume take-up discussed above and accompanying buckling of the respective web.

In addition, in correspondence with the respective damping requirements the respective web section can have a plurality of webs which are formed asymmetrically with the same direction. Through provision of a plurality of webs in a web section, it is possible to influence, in simple manner, the size of the volume absorption by the resilient membrane, a trend to greater volume absorption being made possible through more webs. In that case, the three-dimensionally identical orientation of the asymmetries of the web cross-sections ensures that the webs also buckle in the same predetermined direction, so that the webs at the time of buckling cannot be mutually obstructive and thus the same volume absorption in the respective web section always takes place in reproducible manner.

Moreover, the profiling of the membrane can advantageously include a plurality of web sections. With increase in the number of web sections, the volume take-up by the resilient membrane can be increased in correspondence with the respective damping requirements. In addition, if in this connection—for example in the case of the afore-described resilient membrane with a recessed or flush web structure—the grooves of at least two web sections are formed to be of different depth from web section to web section the increased volume take-up capability of the resilient membrane can be "stretched" over a larger pressure range. Thus, the device does not have to have only one "operating point", but can have different "operating points" at which buckling of the respective webs takes place in dependence on pressure so as to effectively damp pressure pulsations in different vibration-critical pressure regions by abruptly increased volume absorption.

As far as the basic geometry of the resilient membrane is concerned, different membrane variants are conceivable. Thus, the resilient membrane can be, for example, a flat or arched disc, the surface of which remote from the pressure wall is provided with a profiling according to the invention. However, a design in which the resilient membrane is substantially tubular is currently preferred. The profiling according to the invention can then be disposed at an inner circumferential surface, which is remote from the pressure chamber, of the resilient membrane or, preferably, at an outer circumferential surface, which is remote from a pressure chamber, of the resilient membrane.

With respect to the course of the web or webs at a substantially tubular resilient membrane different variants are similarly possible. Thus, the web can, for example, extend spirally or in the form of a helix at the circumferential surface of the resilient membrane. However, with respect to, in particular, simple manufacture it is preferred if the respective web is formed to be encircling at the outer circumference of the substantially tubular resilient membrane or to extend in longitudinal direction of the tubular resilient membrane.

In principle, various materials can be used as material for the resilient membrane. Thus, for example, use can be made of an elastomer on the basis of an acrylonitrile-butadiene-styrol rubber (NBR) or on the basis of a hydrogenated acrylonitrile-butadiene-styrol rubber (HNBR), particularly if fluids containing mineral oil are used in the hydraulic actuating system. However, with respect to durability relative to usual fluids in hydraulic clutch actuating systems for motor vehicles a resilient membrane made from an elastomer on the basis of ethylene-propylene-diene rubber (EPDM) is currently preferred.

Fundamentally, the housing of the device can be designed so that it has only one connection by way of which the device is connectable in parallel with the hydraulic actuating system. However, a construction is preferred in which the housing has a first and a second connection, between which the pressure chamber is disposed and by way of which the device is serially connectable into the hydraulic actuating system so that a fluid flow is capable of running through the pressure chamber between the connections, which by comparison with the afore-mentioned alternative with merely one connection promises better damping action for only small flow resistance.

The arrangement with two housing connections is preferably such that the first connection, the tubular membrane surrounding the pressure chamber and the second connection are seated one after the other in the housing on a common axis, wherein each connection is in fluid-connection with the pressure chamber by way of a flow-deflecting connecting section extending substantially transversely to the common axis. This construction advantageously has the consequence that the pressure pulsation in the fluid column is quasi conducted to the tubular membrane so as to be dealt with in vibration-damping manner as described above.

Further, in this embodiment of the device a throttle bore which extends along or parallel to the common axis of the connections can be provided between the pressure chamber and the connecting section on the side of the first connection and/or the side of the second connection for increase in the damping effect, so that when the hydraulic actuating system is actuated a part of the fluid column is displaced through the respective throttle bore.

Finally, in the case of two housing connections in series the device can be constructed in such a way that the first connection is a master connection, whereas the second connection is a slave connection, in which case as seen from the first connection in the direction of the pressure chamber a further throttle bore or constriction extending along or parallel to the common axis of the connections is provided in front of the connecting section. By virtue of this further throttle bore, which represents an additional resistance from the pressure chamber to the master connection, the resilient membrane has more ability to absorb or diminish pressure pulsations passing by way of the slave connection into the device.

BRIEF DESCRIPTION OF THE DRAWINGS

The invention is explained in more detail in the following by way of a preferred embodiment and variants with respect thereto with reference to the accompanying schematic drawings, in which the same reference numerals characterize the same or corresponding parts and elastomeric components are, for simplification of the illustration, generally shown in undeformed state. In the drawings.

DETAILED DESCRIPTION OF THE EMBODIMENT

Figure 1:
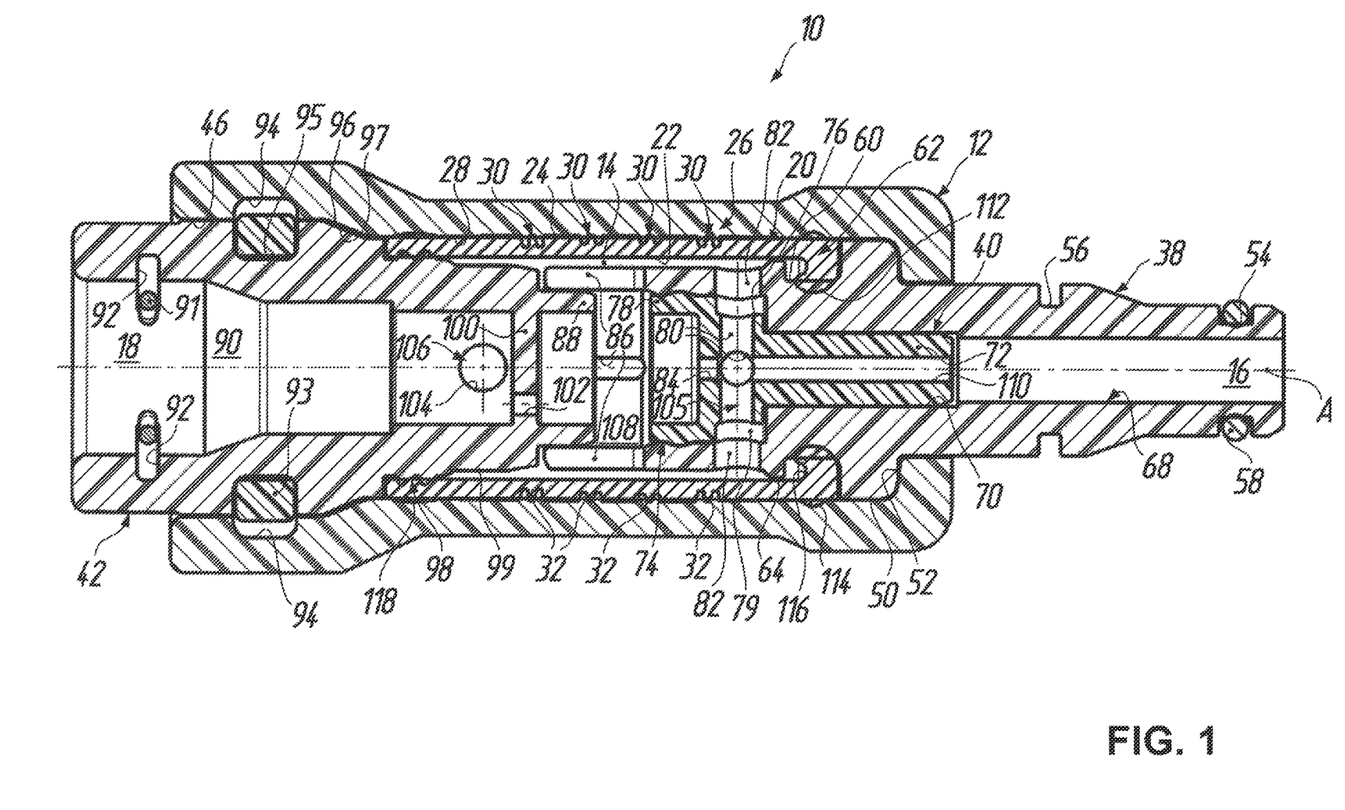
FIG. 1 shows a longitudinal sectional view of a device according to the invention for reducing vibrations in hydraulic clutch actuating system for motor vehicles, with a housing in which as seen from right to left in FIG. 1 are mounted as principal components a first plug connector, a press-in sleeve received therein, a tubular resilient membrane, which radially outwardly bounds a pressure chamber in the housing, with profiling at the outer circumferential side for volume absorption, and a second plug connector.

In FIG. 1 the reference numeral 10 generally denotes a device for reducing vibrations in a hydraulic actuating system such as, for example, a hydraulic clutch actuating system for motor vehicles. The device 10 comprises a housing 12 in which a pressure chamber 14 able to be fluid-connected with the hydraulic actuating system by way of at least one connection—in the case of the illustrated embodiment two connections 16, 18—is formed. In that regard, the pressure chamber 14 is disposed between the connections 16, 17, by way of which the device 10 in this configuration can be serially connected into the hydraulic actuating system so that a fluid flow is capable of passing between the connections 16, 18 through the pressure chamber 14.

Figure 6:
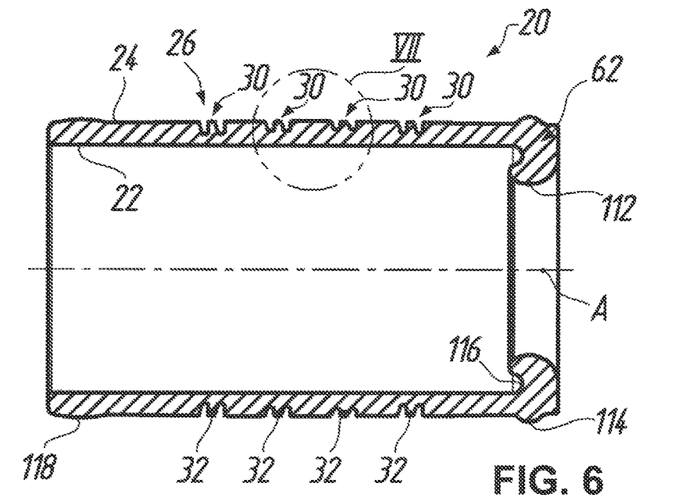
FIG. 6 shows a longitudinal sectional view of the tubular resilient membrane of the device according to FIG. 1 as an individual part.

The pressure chamber 14 of the device 10 is in that case bounded by a resilient membrane 20 which is separately shown in FIG. 6 and which has a pressure-loadable surface 22 facing the pressure chamber 14 and a surface 24 remote from the pressure chamber 14. The latter, as will be described in more detail, is provided with a profiling 26 by way of which the membrane 20 when subjected to pressure loading can be supported on a fixed wall section 28 of the housing 12.

This profiling 26 has at least one web section, in the illustrated embodiment a plurality of web sections 30 each with at least one web 32. As evident particularly from FIGS. 6 and 7, each web 32 has—in the mounted state of the membrane 20—a web foot 34 distant from the wall section 28 of the housing 12 (indicated in FIG. 7 in each instance in dashed lines), a web end 36 near the wall section 28 of the housing 12, and a defined web cross-section. It is important that, as will similarly be explained in more detail, the or each web 32 is formed asymmetrically with respect to a or a respective notional plane E (indicated in FIG. 7 in each instance centrally at the web foot 34 by a dot-dashed line), which extends normal to the pressure-loadable surface 22 of the membrane 20 through the web foot 34 and perpendicularly to the web cross-section, so that the or each web 32 when the membrane 20 is subjected to predetermined pressure loading buckles without hindrance in a predetermined direction with support of the web end 36 on the fixed wall section 28 of the housing 12.

Figure 2:
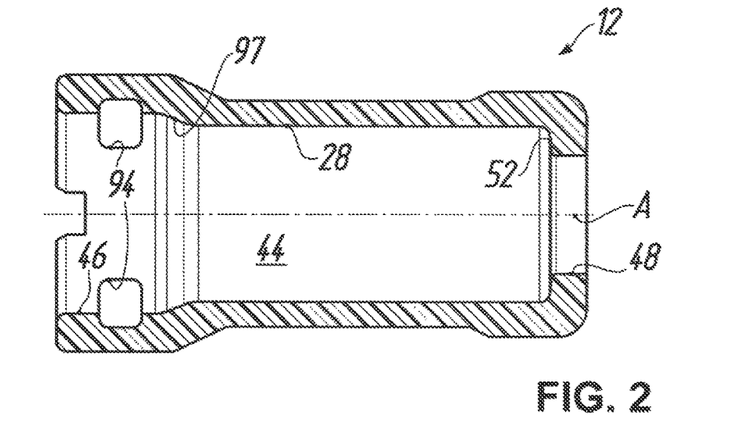
FIG. 2 shows a longitudinal sectional view of the housing of the device according to FIG. 1 as an individual part.

As can additionally be inferred from FIG. 1, the device 10—formed from only a few parts, which are not movable in operation—includes, apart from the housing 12 shown separately in FIG. 2 and injection-molded from plastics material and the resilient membrane 20 which is illustrated in FIG. 6 and made from, for example, an elastomer on an ethylene-propylene-diene rubber (EPDM) base, further parts which are injection-molded from plastics material and which are secured in the housing 12 to complete the device 10. These parts are shown individually in FIGS. 3 to 5, namely a first plug connector 38 (FIG. 3) forming—as a plug component—the connection 16 of the device 10, a press-in sleeve 40 (FIG. 4) received therein, and a second plug connector 42 (FIG. 5), which—as a socket component—forms the connection 18 of the device 10.

According to FIG. 2 the housing 12 of the device 10 in that case is provided with a central stepped passage bore 44, which has substantially three sections with an inner diameter decreasing in FIG. 2 from the left to the right, in particular a fixing section 46, which is on the left in FIG. 2, for the second plug connector 42, the central, fixed wall section 28 as pressure surface or counter-surface for the resilient membrane 20 and a through section 48, which is on the right in FIG. 2, for the first plug connector 38.

The first plug connector 38 is secured by a press connection in the through section 48 of the housing 12, wherein an annular collar 50 integrally formed at the outer circumference of the first plug connector 38 bears inside the housing 12 against a shoulder 52 of the housing 12, which is formed between the wall section 28 and the through section 48 of the passage bore 44. In the pressed-in state shown in FIG. 1, the first plug connector 38 protrudes by a plug geometry, which is known per se, beyond the housing 12, which has at the outer circumference two axially spaced radial grooves 54 and 56, of which the outer radial groove 54 serves for reception of an O-ring 58 for sealing relative to the mating part (not shown), while the second radial groove 56 in the mounted state of the device 10 receives a securing element of spring-steel wire (not illustrated), which is fastened to the mating part.

Figure 3:
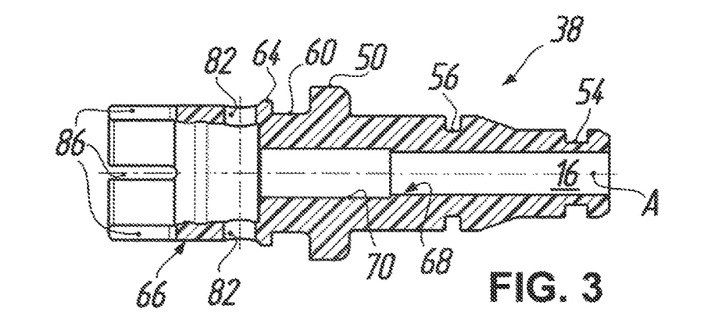
FIG. 3 shows a longitudinal sectional view of the first plug connector of the device according to FIG. 1 as an individual part.

A further radial groove 60 of the first plug connector 38 adjoins the annular collar 50 on the side thereof at the left in FIGS. 1 and 3 and serves for reception of an end sealing geometry 62 (cf. FIG. 6) of the membrane 20, which is of substantially tubular form in this embodiment. Following the radial groove 60 on the left in FIGS. 1 and 3 is a further annular collar 64 before the first plug connector 38 ends by a substantially annular receiving and centering section 66, the outer diameter of which is smaller than the inner diameter of the inner circumferential surface 22 of the membrane 20 so that the receiving and centering section 66 of the first plug connector 38 radially inwardly bounds the substantially annular pressure chamber 14 of the device 10.

At the inner circumference the first plug connector 38 is similarly provided on the right in FIGS. 1 and 3 and adjacent to the receiving and centering section 66 with a central, singly stepped passage bore 68 having a bore section 70 which is on the left in FIG. 1 and is larger in diameter and which serves, as shown there, for tight reception of a tubular projection 72 of the press-in sleeve 40, whereas the smaller-diameter bore section, which is on the right in FIG. 1, of the passage bore 68 defines the clear opening cross-section of the connection 16.

Figure 4:
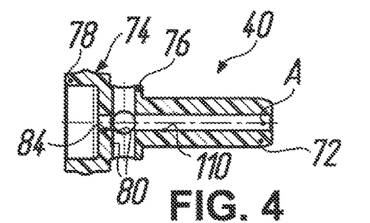
FIG. 4 shows a longitudinal sectional view of the press-in sleeve of the device according to FIG. 1 as an individual part.

The press-in sleeve 40 additionally has a head 74, which is singly stepped at the outer circumference and from which the tubular projection 72 extends away to the right in FIGS. 1 and 4. In that case, the head 74 of the press-in sleeve 40 has a smaller-diameter middle section 76, which is connected with the tubular projection 72, and a larger-diameter collar section 78 at its free end. Whereas the press-in sleeve 40 is held in the receiving and centering section 66 of the first plug stub pipe 38 by mechanically positive and frictional couple by the collar section 78 of the head 74, the middle section 76 of the head 74 bounds, together with an inner circumferential surface of the receiving and centering section 66 of the first plug connector 38, an annular intermediate space 79 (see FIG. 1) between press-in sleeve 40 and plug connector 38.

In addition, the middle section 76 of the head 74 of the press-in sleeve 40 is provided with two transverse bores 80 which extend at right angles to one another and to the tubular projection 72 and which communicate with the intermediate space 79, as shown in FIG. 1. Diametrically opposite connecting bores 82, which are optionally aligned with one of the transverse bores 80 in the head 74 of the press-in sleeve 40, in the receiving and centering section 66 of the first plug connector 38 connect the intermediate space 79 with the pressure chamber 14 between plug connector 38 and membrane 20. Moreover, the press-in sleeve 40 is provided in the region of the head 74 with a throttle bore 84 connecting the transverse bores 80 with the interior of the collar section 78 of the head 74.

As additionally evident from FIG. 1, ultimately the receiving and centering section 66 of the first plug connector 38 serves at its free end, which is provided with longitudinal slots 86, for tight reception of a centering collar 88 of the second plug connector 42.

Figure 5:
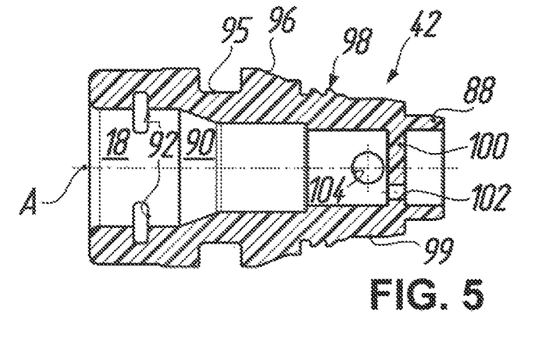
FIG. 5 shows a longitudinal sectional view of the second plug connector of the device according to FIG. 1 as an individual part.

According to FIGS. 1 and 5, the second plug connector 42 is constructed as a socket or receiving component with, at the inner circumference, a receiving geometry known per se and has a recess 90 into which a plug mating part (not shown) is insertable, and a securing element 91 of spring-steel wire indicated in FIG. 1, which is arranged largely at the outer circumference and engages through plug slots 92—which extend transversely to the connection 18—in the second plug connector 42 so as to secure the plug mating part in a manner known per se in the recess 90 in the mounted state of the device 10.

The second plug connector 42 itself is mechanically positively held in analogous manner in the housing 12, wherein a yoke-shaped securing element 93 of plastics material, indicated in FIG. 1, engages in the manner of a cross-slide through associated recesses 94 in the fastening section of the housing 12 so as to be disposed in engagement with a radial groove 95, which is formed at the outer circumference of the second plug connector 42, and thus to hold the second plug connector 42 in the housing 12.

A partly chamfered joining section 96 follows the radial groove 95 on the right in FIG. 5 at the outer circumference of the second plug connector 42. The section 96 together with a transition section 97 of complementary form between the fixing section 46 and the hollow-cylindrical wall section 28 of the housing 12 limits the axial insertion depth of the second plug connector 42 into the housing 12. A fixing section 98 for the membrane 20 is provided with a sawtooth-shaped profiling in order to detent at the inner circumference with the end of the membrane 20 on the left in FIG. 1, and adjoins—after a step—the joining section 96 of the second plug connector 42 on the right in FIG. 5. A smaller-diameter end section 99 of the second plug connector 42 follows the fixing section 98 on the right in FIG. 5, which just like the receiving and centering section 66 of the first plug connector 38 radially inwardly bounds the annular pressure chamber 14 (see FIG. 1).

According to FIGS. 1 and 5 the recess 90 in the second plug connector 42 axially ends in the region of the end section 99 at a base section 100 of the second plug connector 42, which the centering collar 88 adjoins. The base section 100 is provided with an eccentrically arranged throttle bore 102 connecting the recess 90 in the second plug connector 42 with the interior of the centering collar 88. Finally, also formed in the second plug stub pipe 42 is a transverse bore 104 which extends completely through the end section 99 so as to connect the recess 90 with the pressure chamber 14.

To that extent, it is apparent that in the mounted state of the device 10 (see FIG. 1) the first connection 16, the tubular membrane 20 surrounding the pressure chamber 14 and the second connection 18 are arranged in the housing 12 on a common axis A in succession. In that case, each connection 16, 18 is in fluid connection with the pressure chamber 14 by way of flow-deflecting connecting sections 105, 106 extending substantially transversely to the common axis, of which section 105 in the illustrated embodiment on the side of the first connection 16 comprises the transverse bores 80 in the middle section 76 of the press-in sleeve 40, the intermediate space 79 between the press-in sleeve 40 and plug connector 38 and the connecting bores 82 in the first plug connector 38, whereas the connecting section 106 is formed on the side of the connection 18 by the transverse bore 104. The pressure chamber 14 itself communicates with the inner space 108—which is radially bounded by the collar section 78 of the press-in sleeve 40, the receiving and centering section 66 of the first plug connector 38 and the centering collar 88 of the second plug connector 42—between press-in sleeve 40 and plug connector 42 via the longitudinal slots 86 in the receiving and centering section 66 of the first plug connector 38. Moreover, additionally provided between the pressure chamber 14 and the connecting section 105 on the side of the first connection 16 and between the pressure chamber 14 and the connecting section 106 on the side of the second connection 18 are the throttle bores 84, 102 which are in fluid connection with the pressure chamber 14 via the inner space 108 and the longitudinal slots 86 and which extend along or parallel to the common axis A.

The installation of the device 10 in the hydraulic actuating system is preferably carried out in such a way that the first connection 16 functions as a master connection and the second connection 18 as a slave connection. In that case, the tubular projection 72 of the press-in sleeve 40 forms a further throttle bore 110 which, as seen from the first connection 16 in the direction of the pressure chamber 14, lies in front of the connecting section 105 and there extends along the common axis A.

The resilient membrane 20 also seals the device 10 relative to the environment and, in particular, between the housing 12 and the first plug connector 38 as well as between the housing 12 and the second plug connector 42. Further details with respect thereto can be inferred from FIGS. 1 and 6. Accordingly, the sealing geometry 62 formed at the end of the membrane 20 on the right in FIG. 6 serves for sealing between the housing 12 and the first plug connector 38. The sealing geometry comprises a substantially spherically formed annular collar 112, which projects radially inwardly from the surface 22 of the membrane 20 facing the pressure chamber 14 and which is received in the radial groove 60 of the first plug connector 38, an encircling sealing bead 114 formed at the surface 24 remote from the pressure chamber 14, and an axial groove 116 formed on the side of the annular collar 112 facing the pressure chamber 14. It will be apparent to the expert that a pressure arising in the axial groove 116 of the membrane 20 from the pressure chamber 14 additionally presses the sealing geometry 62 thereof against the adjoining surfaces of housing 12 and plug connector 38. In addition, provided at the end of the membrane 20 on the left in FIGS. 1 and 6 at the surface 24 remote from the pressure chamber 14 is an encircling sealing bead 118 which when the wall section 28 contacts the housing 12 serves the purpose of firmly pressing the left-hand end of the membrane 20 with the sawtooth-shaped profiling against the fixing section 98 of the second plug connection 42 and in that case also providing a seal between the housing 12 and the second plug connector 42.

Further details with respect to the geometry of the webs 32 at the resilient membrane 20 and the effect thereof shall be described in the following with reference to FIGS. 7, 8, 12 and 13. In that connection, FIG. 7 shows a part of the profiling, which is formed at the membrane 20 of the embodiment according to FIG. 1, for volume absorption, in which each web section 30 has only one web 32, whereas FIG. 8 illustrates a variant in which each web section 30 has two (or more), thus a plurality of, webs 32, which are formed asymmetrically to be directed in the same sense.

In the first instance, it is common to these examples that the web cross-section has substantially the form of a trapezium, particularly a right-angled trapezium, wherein the respective web foot 34 forms the base of the trapezium. In that regard, each of the webs 32 is formed by two grooves 120, which are spaced apart by the width of the respective web 32 and which emanate from the surface 24 of the membrane 20 remote from the pressure chamber 14, of the corresponding web section 30, wherein the web 32 extends by its web end 36 in the illustrated undeformed state of the membrane 20 to at most the height of the surface 24 remote from the pressure chamber 14.

Figure 7:
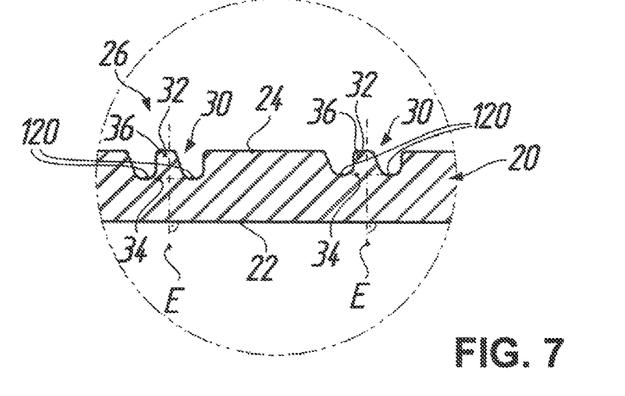
FIG. 7 shows an illustration, to enlarged scale, of the detail VII in FIG. 6 for clarification of specifics of the profiling, which is provided at the resilient membrane, for volume absorption, the webs of which are formed at the outer circumference of the membrane to encircle.

According to FIG. 7 the grooves 120 are formed by at least two—here all (cf. FIGS. 1 and 6)—web sections 30 to be of different depth from web section 30 to web section 30. As a result, in the embodiment according to FIGS. 1, 6 and 7 the webs 32 of different web sections 30 are of different height so as to generate different buckling behavior under pressure. By contrast, in the variant according to FIG. 8 all webs 32 are the same height so that buckling of the webs 32 can be expected at approximately one and the same pressure. In general, the ratio of a mean width of the individual web 32 to its height should be equal to or greater than ⅓ and equal to or smaller than 1, as already mentioned in the introduction.

Figure 8:
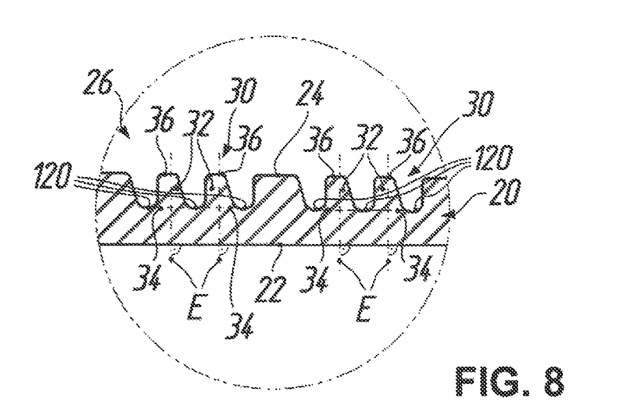
FIG. 8 shows an illustration, to enlarged scale, of a variant of the profiling, which is formed at the resilient membrane, for volume absorption with encircling webs, in a detail and in the manner of illustration corresponding with FIGS. 6 and 7.

In the examples, according to FIGS. 7 and 8 the individual web 32 is ultimately formed at the outer circumference of the substantially tubular membrane 20 to be completely encircling so that the web 32 is uninterrupted in its main length, i.e. predominant direction.

Figure 12:
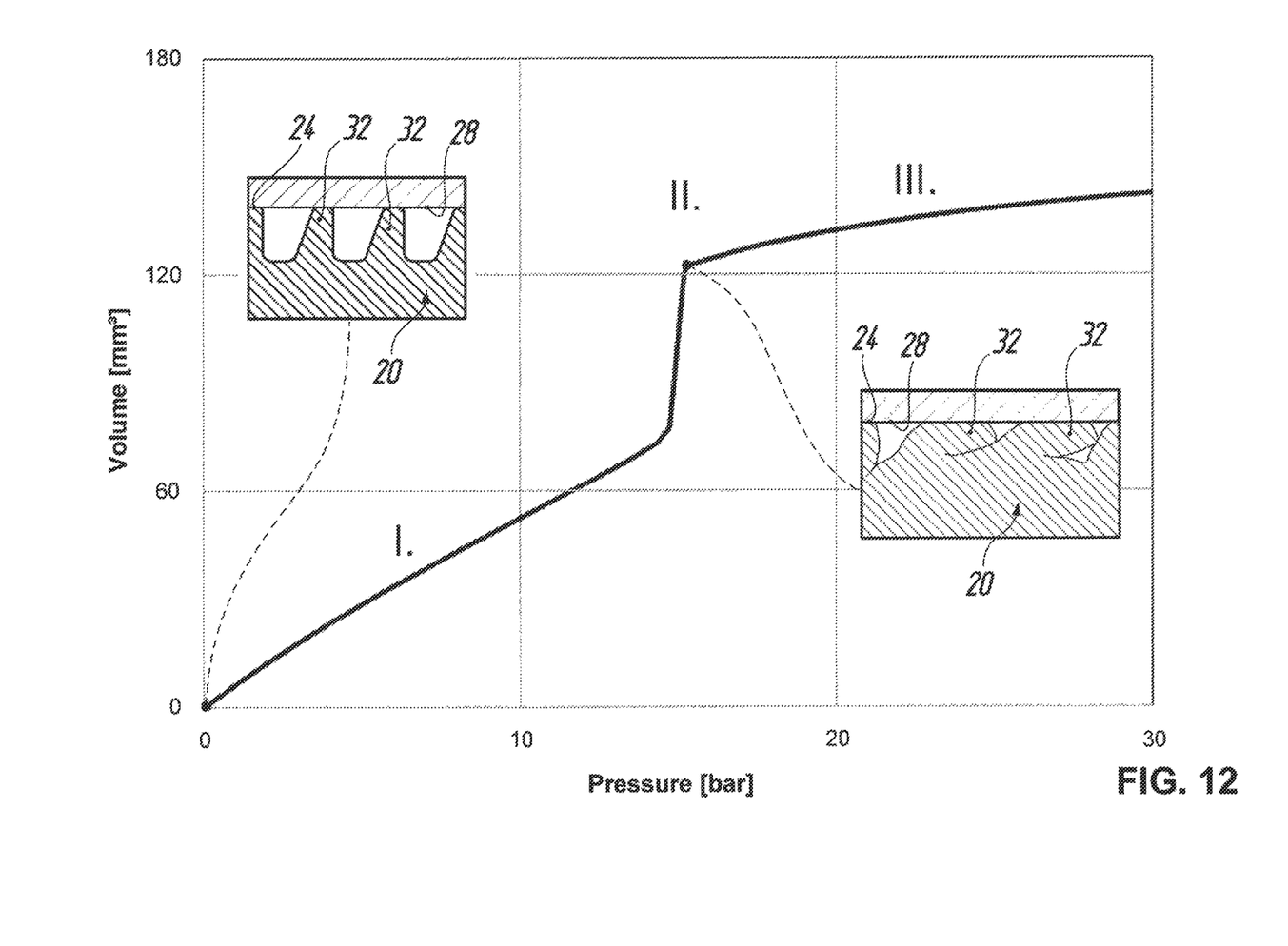
FIG. 12 shows a diagram in which the volume absorption is recorded in $mm^3$ over pressure in bars for a profiling, which is formed in correspondence with FIG. 8, of the resilient membrane, the webs of the profiling being formed to be asymmetrical in accordance with the invention and being illustrated for a pressure of 0 bars in an undeformed state and for a pressure of somewhat above 15 bars in a defined buckled state, as the result of a Finite Element Method (FEM) computation model.
Figure 13:
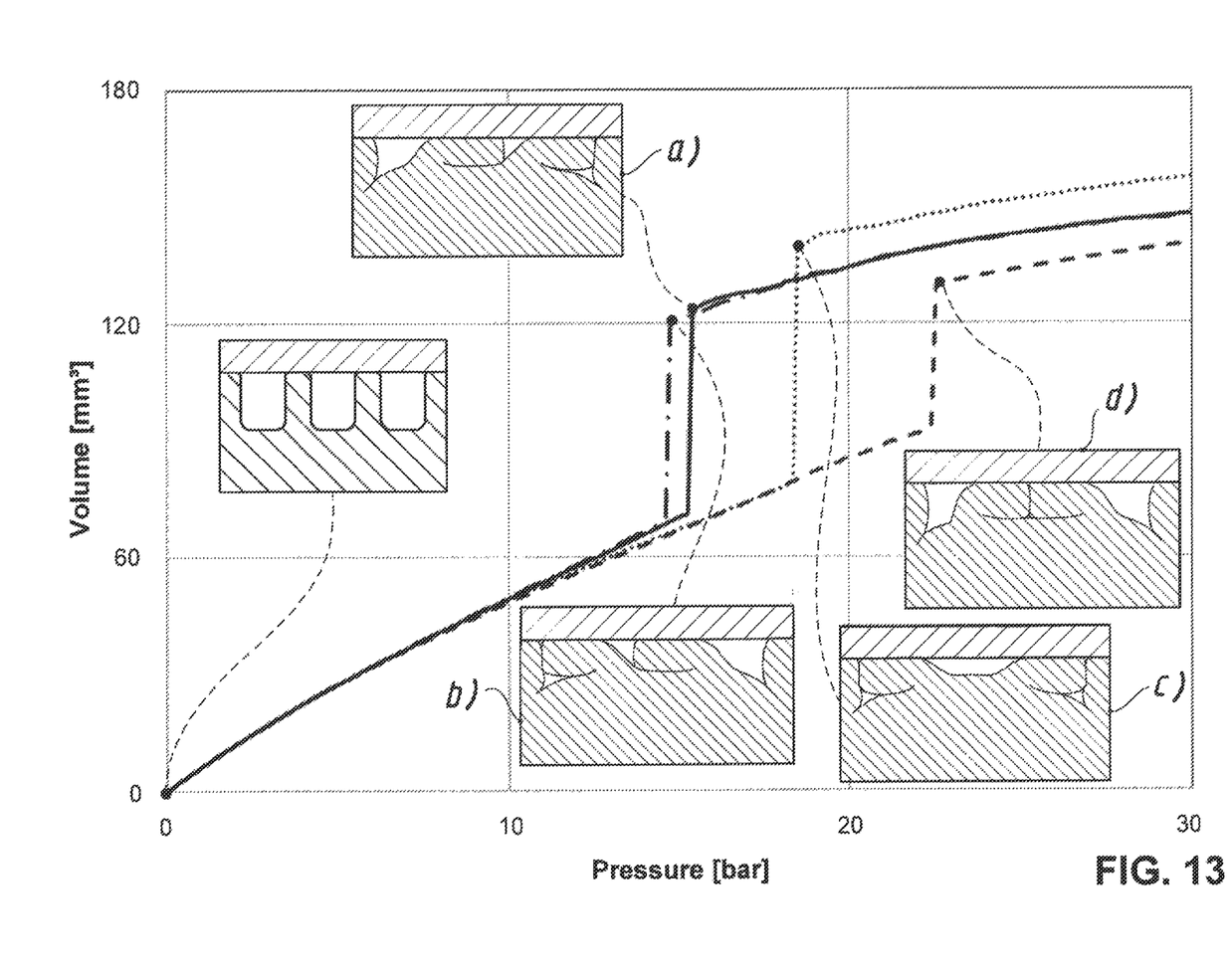
FIG. 13 shows a diagram similar to the diagram according to FIG. 12, in which again the volume absorption in $mm^3$ is recorded against pressure in bars for a profiling at the resilient membrane, the webs of the profiling being formed—otherwise than in accordance with the invention—to be symmetrical and being illustrated for a pressure of 0 bars in an undeformed state and in a pressure range of approximately 15 to 22 bars in various, undefined buckled states, again as a result of a FEM computation model.

FIGS. 12 and 13 now illustrate the effect of the selected asymmetrical cross-sectional shape of the webs 32 (see the illustration in FIG. 12 at the top left) by comparison with webs which have a symmetrical cross-sectional shape otherwise than in accordance with the invention (cf. the illustration in FIG. 13 center left). The characteristic curves and deformations illustrated in FIGS. 12 and 13 are in that case the product of an FEM computation model with the following parameters: Computation was carried out in each instance with a rotationally symmetrical cylinder pipe, comparable with the afore-described resilient membrane 20, with an inner radius of 5.9 millimeters and an outer radius of 9.2 millimeters. Rubber with hardness of 70 Shore A was simulated as material for the cylinder pipe. The height or free length of the webs was 1.1 millimeters and the width of the webs with symmetrical cross-sectional shape was 0.5 millimeters. A pressure of 0 to 30 bars was applied to the inner wall. The outer wall and the sides of the cylinder pipe were bounded by fixed wall surfaces.

The results, which are shown in FIG. 12, for the asymmetrical profile of the webs 32 in accordance with the invention can be summarized as follows: In a first sub-region I, prior to buckling of the webs 32, the volume/pressure characteristic curve extends flatly and substantially linearly or only slightly degressively. The webs 32 are somewhat compressed in height, which leads to a comparatively small volume increase.

If the pressure and thus the force acting on the respective web 32 is further increased then this leads to loss of stability of the webs 32. The webs 32 tilt or buckle with a defined, uniform direction of buckling (here to the right) towards the side (see the illustration of the webs 32 on the right in FIG. 12). Influences such as, for example, component tolerances, local changes in friction, fluctuations in material, vibrations and changes in temperature in that case do not lead to a change in the direction of buckling; the defined direction of buckling is maintained. In this second sub-region II the volume/pressure characteristic curve extends almost in the manner of a jump, i.e. very steeply and progressively.

In the following third sub-region III the volume/pressure characteristic curve again extends flatly and substantially linearly or only slightly degressively. The residual cavity between the buckled webs 32 is reduced in the case of further increase in pressure, which explains the further, rather small increase in volume.

As a result, an always reproducible volume/pressure characteristic curve arises as a consequence of the clearly defined direction of buckling of the webs 32 with asymmetrical cross-sectional shape. In that regard, it is possible to influence the pressure value of the buckling, particularly by the resilient material of the membrane 20 and the geometry of the webs 32: Thus, the stiffness of the component increases with increasing Shore hardness, as a result of which the "buckling point" of the volume/pressure characteristic curve displaces to the right (higher pressure). By contrast, with softer rubber mixtures the pressure can be displaced to the left towards lower pressures. As far as the geometry of the webs 32 is concerned, it can be said that the selection of a "more slender" form of the webs 32 (thinner and/or higher) has the consequence of buckling of the webs 32 at a lower pressure. If, by contrast, the stiffness of the webs 32 is increased (thicker and/or lower), then the webs 32 buckle only at a higher pressure. It is, of course, necessary to ensure that the width of the webs 32 does not become too large and/or the height of the webs 32 too small, since otherwise the web 32 cannot buckle laterally and consequently there is no progressive sub-region in the volume/pressure characteristic curve.

The results illustrated in FIG. 13 for a symmetrical profile of the webs as disclosed in U.S. Ser. No. 13/145,408 filed on Aug. 8, 2011 and incorporated herein by reference otherwise in accordance with the invention can be summarized as follows: The symmetrically formed webs have an undefined direction of buckling or an undefined buckling behavior. Even slight changes can have the consequence that the same web buckles on one occasion to the left and on another occasion to the right. Local changes can be in friction, component tolerances, vibrations, material fluctuations and temperature changes can be regarded as possible influencing factors. The webs can accordingly buckle in the following directions, as shown in the illustrations in FIG. 13: a) both webs to the right; b) both webs to the left; c) both webs respectively outwards; and d) both webs respectively inwards. Due to the undefined direction of buckling the variation of the volume/pressure characteristic curve is very substantial.

In detail: With respect to a) and b): Buckling of both webs in the same direction, this thus taking place at a lower pressure than in the case of an opposite direction of buckling of the webs. The influence is to be found in the surrounding material base of the webs. If both webs buckle in the same direction, then the entire base of the webs also moves in one direction. With respect to c) and d): Buckling of the webs in opposite directions, additional tension or compression stresses thus building in the material base between the webs depending on the respective direction of buckling. For that purpose, more force is necessary, which is similarly supplied by the applied pressure. Webs therefore buckle in opposite sense only at somewhat higher pressures. A further reason for the higher pressure in buckling may reside in the fact that the opposite form of buckling has a greater stiffness. With respect to c): Buckling of the two webs to the outside, this thus having the consequence that the stiffness, particularly in the center between the webs, is lower. This causes a greater degree of deformation during buckling and thus a higher volume absorption of the component. For this reason, the volume/pressure characteristic curve after buckling here lies above the other characteristic curves. With respect to d): Buckling of the two webs inwardly, this thus having the consequence that the stiffness of the component, particularly between the webs which may be supported against one another, rises. This produces a smaller degree of deformation during buckling and thus a lower volume absorption of the component. For this reason, the volume/pressure characteristic curve after the buckling here lies below the other characteristic curves. The increased stiffness of this form of buckling also has the consequence that the process of buckling takes place only at a higher pressure.

As a result, it can be seen that due to the undefined direction of buckling of the webs with symmetrical cross-sectional shape a volume/pressure characteristic curve of the component is not clearly predictable, which is counter to targeted volume absorption at a pressure of predetermined height.

Figure 9:
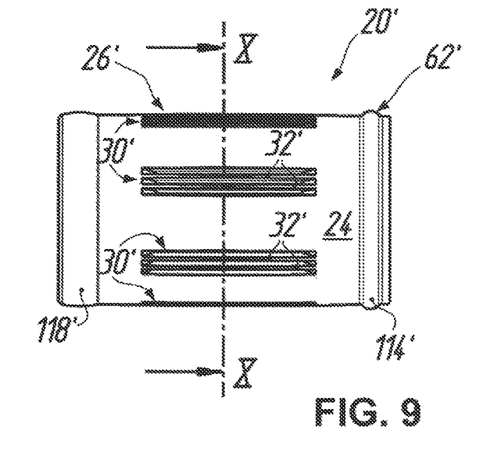
FIG. 9 shows a side view, to a scale reduced by comparison with FIG. 6, of a tubular resilient membrane with an alternatively formed profiling for volume absorption, the webs of which are formed at the outer circumference of the membrane to extend in longitudinal direction.
Figure 10:
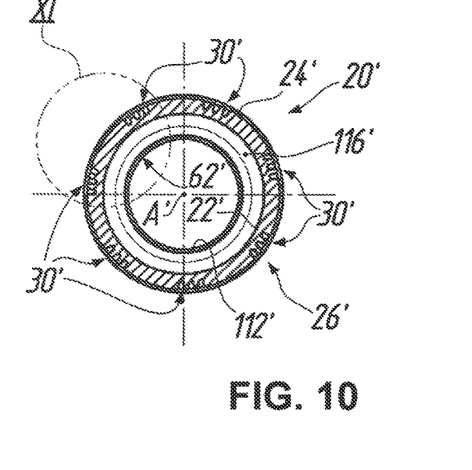
FIG. 10 shows a sectional view of the tubular resilient membrane according to FIG. 9 in correspondence with the section line X-X in FIG. 9.
Figure 11:
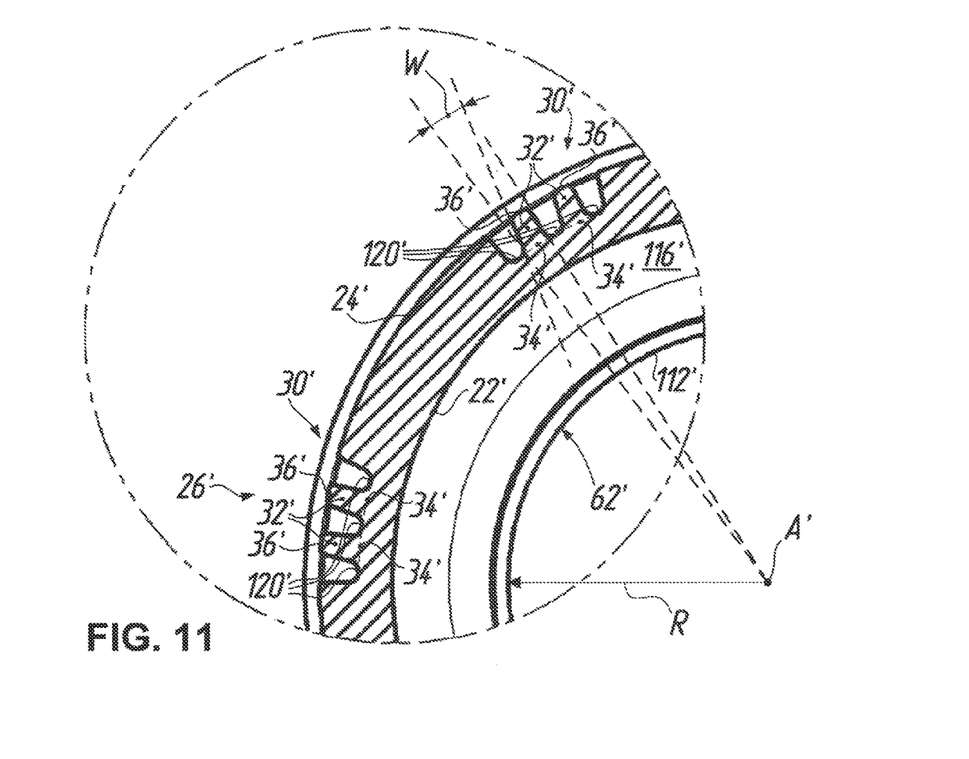
FIG. 11 shows an illustration, to enlarged scale, of the detail XI in FIG. 10 for clarification of specifics of the profiling, which is provided at the resilient membrane according to FIG. 9, for volume absorption, particularly the asymmetrical construction of the webs of the profiling.

Finally, FIGS. 9 to 11 additionally show a tubular resilient membrane 20' which can be used instead of the membrane 20 in the device 10 described above with reference to, in particular, FIG. 1, the membrane 20' having for that purpose the same sealing measures (sealing geometry 62' with sealing bead 114' at the end on the right in FIG. 9 as well as sealing bead 118' at the end on the left in FIG. 9) and by comparison with the membrane 20 being provided with a profiling 26' of alternative construction for volume take-up. The web sections 30' of this profiling 26' each have two webs 32', which are formed to extend in longitudinal direction of the tubular membrane 20' and thus extend, in the installation case, approximately over the entire length of the pressure chamber 14.

As FIG. 11 shows, in that case the grooves 120' extending in longitudinal direction are constructed so that each web 32' has a side or flank which as seen around the axis A' lies in clockwise sense and which extends in radial direction, whereas a side or flank, which as seen around the axis A lies in anticlockwise sense, of each web 32' includes an acute angle W with the radial direction. As a result, the desired asymmetry of the web cross-section, is provided and produces a clearly defined buckling behavior of the respective web 32', namely in clockwise sense about the axis A' analogously to the afore-described profiling 26 of the membrane 20.

While FIGS. 9-11 show grooves 120' all having the same depth, it is foreseen that the grooves 120' can be formed to be of different depth from web section 30' to web section 30', and also the number of web sections 30', the length and distribution thereof over the circumference of the membrane 20' (for example uniform angular spacing about the axis A' as in the illustrated example) and the number of webs 32' per web section 30' can be varied in correspondence with the respective volume absorption requirements.

In this fashion, a device for reducing vibrations in a hydraulic actuating system comprises a housing in which is formed a pressure chamber fluid-connectable with the actuating system by way of at least one connection and bounded by a resilient membrane. The membrane has a pressure-loadable surface and a surface which is remote therefrom and provided with a profiling, by way of which the membrane when subjected to pressure loading can be supported on a fixed wall section of the housing and which has at least one web section, which comprises at least one web with a web foot, a web end near the wall section and a defined web cross-section. The web is of asymmetrical construction with respect to a notional plane extending normal to the pressure-loadable surface through the web foot and perpendicularly to the web cross-section, so that at a predetermined pressure loading of the membrane the web buckles without hindrance in a predetermined direction with support of the web end at the wall section and thereby produces a defined volume absorption.

Variations and modifications are possible without departing from the scope and spirit of the present invention as defined by the appended claims.

We claim:

1. A device for reducing vibrations in a hydraulic clutch actuating system, for motor vehicles, comprising;
   a housing in which a pressure chamber is formed;
   the pressure chamber being fluid-connectible by way of at least one connection with the hydraulic actuating system and being bounded by a resilient membrane which has a pressure-loadable surface facing the pressure chamber and a remote surface remote from the pressure chamber;
   the remote surface being provided with a profiling by way of which the membrane when loaded with pressure is capable of support on a fixed wall section of the housing;
   at least one web section at said remote surface with at least one web having a web foot distant from the wall section, a web end adjacent to the wall section and a defined web cross-section; and
   each web being formed asymmetrically with respect to a notional plane extending normal to the pressure-loadable surface of the membrane through the web foot and perpendicularly to the web cross-section so that each web when the membrane is subjected to predetermined pressure loading buckles suddenly in a predetermined direction without hindrance and with support of the web end on the wall section.

2. A device according to claim 1, characterized in that the ratio of a mean width of the web to a height of the web is equal to or greater than 1/3 and equal to or smaller than 1.

3. A device according to claim 2, characterized in that the web cross-section has substantially the shape of a trapezium, particularly a right-angled trapezium, wherein the web foot forms the base of the trapezium.

4. A device according to claim 3, characterized in that the web is formed to be uninterrupted in a predominant direction of the web.

5. A device according to claim 1, characterized in that the web is formed by two grooves, which are spaced apart by the width of the web and which emanate from the surface of the membrane remote from the pressure chamber, of the web section, wherein the web extends by its web end in undeformed state of the membrane at most up to the height of the surface remote from the pressure chamber.

6. A device according to claim 5, characterized in that the web section has a plurality of webs formed asymmetrically with all webs asymmetrical in a same direction.

7. A device according to claim 5, characterized in that the profiling of the membrane has a plurality of web sections.

8. A device according to claim 7, characterized in that the grooves of at least two web sections are formed to be of different depth from web section to web section.

9. A device according to claim 1, characterized in that the membrane is substantially tubular.

10. A device according to claim 9, characterized in that the web is formed at the outer circumference of the substantially tubular membrane to encircle or to extend in longitudinal direction of the tubular membrane.

11. A device according to claim 1, characterized in that the membrane consists of an elastomer on the basis of an ethylene-propylene-diene rubber (EPDM).

12. A device according to claim 1, characterized in that housing has a first connection and a second connection, between which the pressure chamber is disposed and by way of which the device is serially connectible into the hydraulic actuating system so that a fluid flow is capable of passing between the connections through the pressure chamber.

13. A device according to claim 12, characterized in that the first connection, the tubular membrane surrounding the pressure chamber and the second connection are arranged in the housing in succession on a common axis, wherein each connection is in fluid connection with the pressure chamber by way of a flow-deflecting connecting section extending substantially transversely to the common axis.

14. A device according to claim 13, characterized in that a throttle bore extending along or parallel to the common axis is provided between the pressure chamber and the connecting section on the side of the first connection and/or the side of the second connection.

15. A device according to claim 14, characterized in that the first connection is a master connection and the second connection a slave connection, wherein a further throttle bore extending along or parallel to the common axis is provided in front of the connection section as seen from the first connection in the direction of the pressure chamber.

16. A device according to claim 13, characterized in that the first connection is a master connection and the second connection a slave connection, wherein a further throttle bore extending along or parallel to the common axis is provided in front of the connection section as seen from the first connection in the direction of the pressure chamber.

17. A device according to claim 1, characterized in that the web section has a plurality of webs formed asymmetrically with all webs asymmetrical in a same direction.

18. A device according to claim 1, characterized in that the web is formed to be uninterrupted in a predominant direction of the web.

19. A device according to claim 1, characterized in that the web cross-section has substantially the shape of a trapezium, particularly a right-angled trapezium, wherein the web foot forms the base of the trapezium.

* * * * *